(12) United States Patent
Hsieh et al.

(10) Patent No.: US 11,694,608 B1
(45) Date of Patent: Jul. 4, 2023

(54) CALIBRATING DEVICE AND METHOD FOR ADJUST LUMINANCE-CHROMINANCE OF PIXELS OF LED PANELS

(71) Applicant: NOVATEK Microelectronics Corp., Hsinchu (TW)

(72) Inventors: Po-Yuan Hsieh, Changhua County (TW); Yu-Yi Chien, New Taipei (TW); Wen-Lung Hung, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 17/657,634

(22) Filed: Apr. 1, 2022

(51) Int. Cl.
*G09G 3/32* (2016.01)
*G09G 3/3233* (2016.01)
*G09G 3/3291* (2016.01)

(52) U.S. Cl.
CPC .............. *G09G 3/32* (2013.01); *G09G 3/3233* (2013.01); *G09G 3/3291* (2013.01); *G09G 2300/026* (2013.01); *G09G 2320/0233* (2013.01); *G09G 2320/0626* (2013.01); *G09G 2320/0693* (2013.01); *G09G 2360/16* (2013.01)

(58) Field of Classification Search
CPC ...... G09G 3/32; G09G 3/3233; G09G 3/3291; G09G 2300/026; G09G 2320/0233; G09G 2320/0626; G09G 2320/0693; G09G 2360/16
See application file for complete search history.

(56) References Cited

U.S. PATENT DOCUMENTS

| 9,060,165 | B2 * | 6/2015 | Liu | ...... H04N 13/271 |
| 2010/0019993 | A1 * | 1/2010 | Chui | ...... G09F 9/33 345/31 |
| 2011/0150101 | A1 * | 6/2011 | Liu | ...... H04N 13/161 348/E13.001 |
| 2012/0056910 | A1 * | 3/2012 | Safaee-Rad | ...... G09G 3/3406 345/77 |
| 2020/0251047 | A1 | 8/2020 | Im et al. | |

* cited by examiner

*Primary Examiner* — Vijay Shankar
(74) *Attorney, Agent, or Firm* — CKC & Partners Co., LLC (57) ABSTRACT

A calibrating device includes a memory and a processor. The memory is configured to store at least one computer readable instruction. The processor is electrically coupled to the memory, and configured to access and execute the at least one computer readable instruction to: analyze an image of a target region which a seam between two LED panels disposed side by side is in, to obtain characteristic data associated with the seam; compare the characteristic data associated with the seam with a predetermined value to generate a comparison result; and adjust grayscale data of pixels which are arranged in two lines of the two LED panels and adjacent to the seam, based on the comparison result, for adjusting luminance-chromaticity of the pixels, wherein the two lines are in a first direction or a second direction, and the first direction is perpendicular to the second direction.

25 Claims, 5 Drawing Sheets

CALIBRATING DEVICE AND METHOD FOR ADJUST LUMINANCE-CHROMINANCE OF PIXELS OF LED PANELS

BACKGROUND

Field of Invention

The present disclosure relates to a calibrating device and a method for adjust luminance-chrominance of pixels of panels. More particularly, the present disclosure relates to a calibrating device for adjust luminance-chrominance of pixels of LED panels and a method for adjust luminance-chrominance of pixels of LED panels.

Description of Related Art

With the development of technology, display devices are wildly used in daily life. For some circumstances, there is a need to use a large LED display device such as LED commercial display for displaying advertisements or sport campaign. However, if a large LED display device is formed by single panel, the cost of this display will be extremely huge.

For solving this problem, two or more small panels can be disposed together to form the large display device. However, when two or more panels are disposed together, it is hard to maintain the same spacing between any two panels, such that bright lines or dark lines will occur in the large LED display device.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure provides a calibrating device, and the calibrating device includes a memory and a processor. The memory is configured to store at least one computer readable instruction. The processor is electrically coupled to the memory, and configured to access and execute the at least one computer readable instruction to: analyze an image of a target region which a seam between two LED panels disposed side by side is in, to obtain characteristic data associated with the seam; compare the characteristic data associated with the seam with a predetermined value to generate a comparison result; and adjust grayscale data of pixels which are arranged in two lines of the two LED panels and adjacent to the seam, based on the comparison result, for adjusting luminance-chromaticity of the pixels, wherein the two lines are in a first direction or a second direction, and the first direction is perpendicular to the second direction.

Another aspect of the present disclosure provides a method for adjust luminance-chrominance of pixels of two LED panels, the method being utilized in a calibrating device, and the method includes: analyzing an image of a target region which a seam between the two LED panels disposed side by side is in, to obtain characteristic data associated with the seam; comparing the characteristic data associated with the seam with a predetermined value to generate a comparison result; and adjusting grayscale data of pixels, which are arranged in two lines of the two LED panels and adjacent to the seam, based on the comparison result, for adjusting luminance-chromaticity of the pixels, wherein the two lines are in a first direction or a second direction, and the first direction is perpendicular to the second direction.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Furthermore, as used herein and in the claims, the singular forms "a" and "an" include the plural reference unless the context clearly indicates otherwise.

Figure 1:
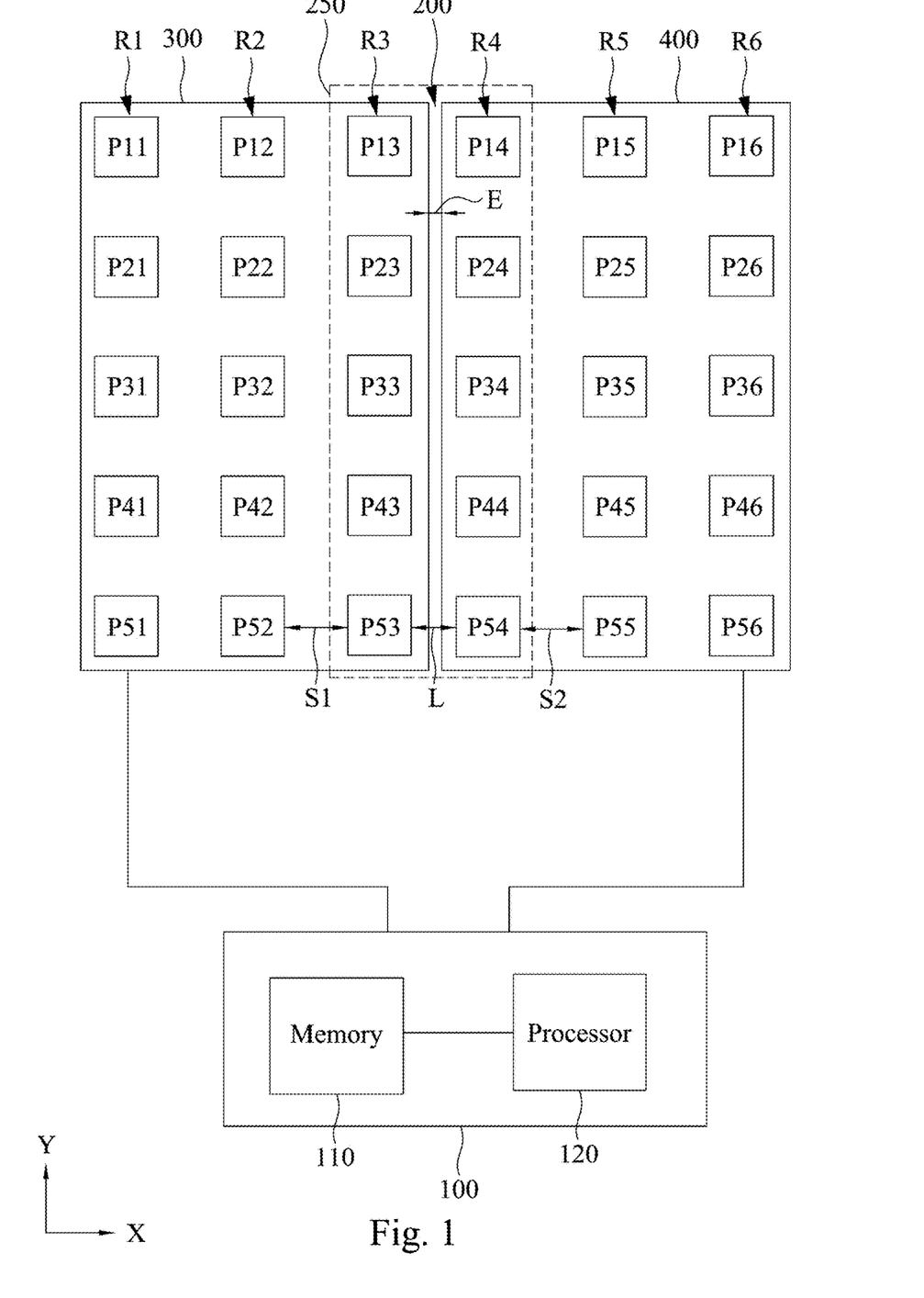
FIG. 1 depicts a schematic diagram of LED panels and a calibrating device according to one embodiment of the present disclosure.

FIG. 1 depicts a schematic diagram of LED panels 300, 400 and a calibrating device 100 according to one embodiment of the present disclosure. As shown in the figure, two LED panels 300, 400 can be disposed side by side and assembled to form a large LED display device. Generally, based on a well-controlled panel manufacturing process, the spacing S1 between every two adjacent pixel lines (along a vertical direction) in the LED panel 300, such as the pixel line R2 and the pixel line R3, may be same or similar to the spacing S2 between every two adjacent pixel lines (along the vertical direction) in the LED panel 400, such as the pixel line R4 and the pixel line R5. However, since the seam 200 appears when the LED panels 300, 400 are disposed and assembled together, it is hard to maintain the spacing L between a boundary pixel line in the LED panel 300 and a boundary pixel line in the LED panel 400, such as the pixel line R3 in the LED panel 300 and the pixel line R4 in the LED panel 400, to be the same as the spacing S1 or the spacing S2. Therefore, there will be visually a bright line or a dark line occurring in a target region 250 which the seam 200 is in when the LED panels 300, 400 are working. Further, when the width of the seam 200 is not uniform, the spacing L is not uniform and nonuniform luminance occurs in the display area around the seam 200 may be not uniform.

In order to eliminate the bright line or the dark line and nonuniform luminance which occurs in the target region 250, the present disclosure provides the calibrating device 100, which will be described below.

The calibrating device 100 includes a memory 110 and a processor 120. The memory 110 is configured to store at least one computer readable instruction. The processor 120 is electrically coupled to the memory 110, and configured to access and execute the at least one computer readable instruction to perform steps of a method 20 for adjust luminance-chrominance of pixels of LED panels as shown in FIG. 2.

Figure 2:
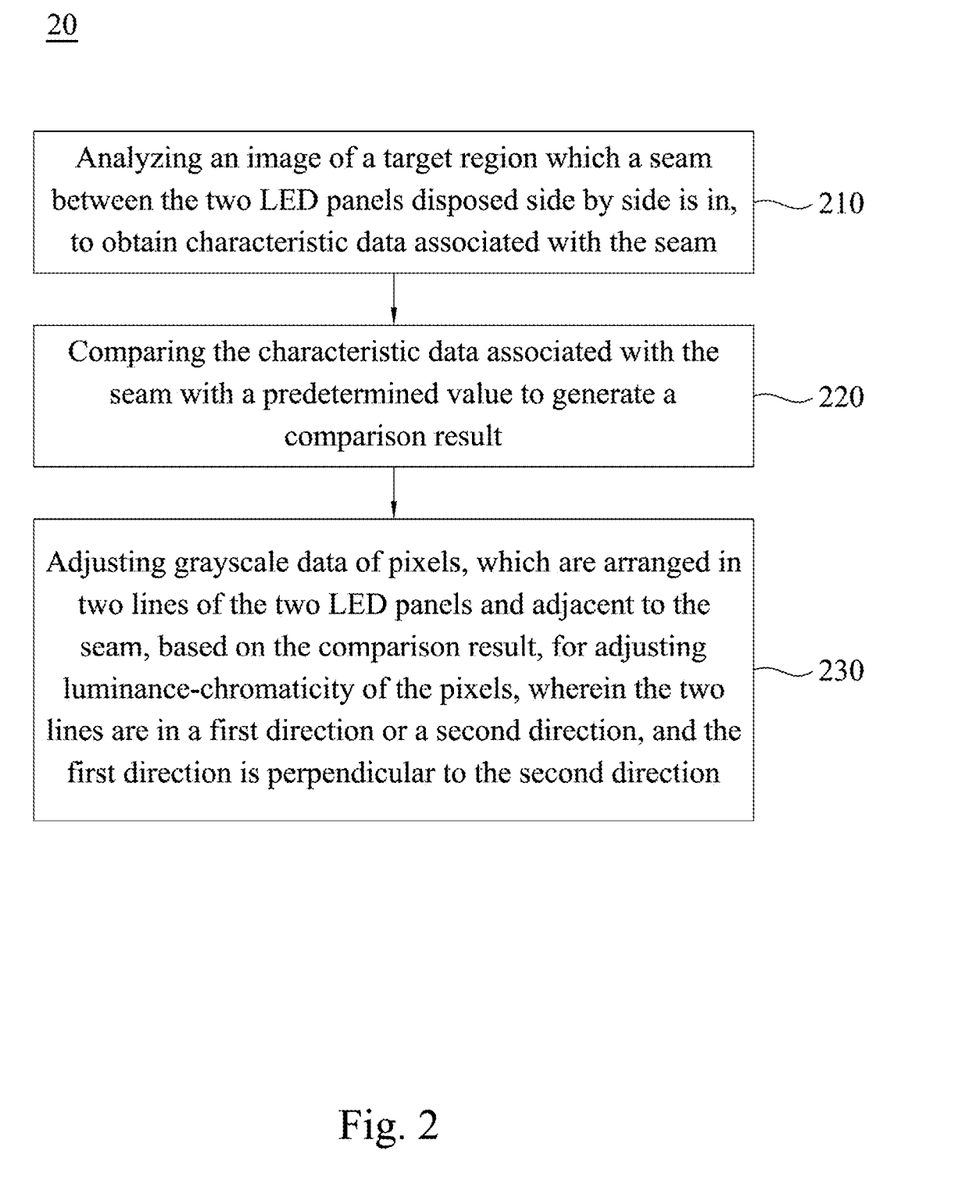
FIG. 2 depicts a flow diagram of a method for adjust luminance-chrominance of pixels of LED panels according to one embodiment of the present disclosure.

Reference is made to both FIG. 1 and FIG. 2. In step 210, the processor 120 accesses and execute the at least one computer readable instruction to analyze an image of the target region 250 which the seam 200 between the two LED panels 300, 400 disposed side by side is in, to obtain characteristic data associated with the seam 200.

For example, in step 210, the processor 120 analyzes the image of the target region 250 to obtain a length E of the seam 200, or to obtain a luminance average of image around the seam 200.

Substantially, in step 220, the processor 120 accesses and execute the at least one computer readable instruction to compare the characteristic data associated with the seam 200 with a predetermined value to generate a comparison result.

For example, in step 220, the processor 120 compares the length E of the seam 200 with a predetermined length value to generate the comparison result, or the processor 120 compares the luminance average of image around the seam 200 with a predetermined luminance average value to generate the comparison result.

In step 230, the processor 120 accesses and execute the at least one computer readable instruction to adjust grayscale data of pixels which are arranged in two lines R3, R4 of the two LED panels 300, 400 and adjacent to the seam 200, based on the comparison result, for adjusting luminance-chromaticity of the pixels, wherein the two lines R3, R4 are in a first direction or a second direction, and the first direction is perpendicular to the second direction.

For example, in step 230, the processor 120 adjusts grayscale data of pixels P13, P23, P33, P43, P53, P14, P24, P34, P44, P54 which are arranged in two lines R3, R4 of the LED panels 300, 400 and adjacent to the seam 200, based on the comparison result, for adjusting luminance-chromaticity of the pixels P13, P23, P33, P43, P53, P14, P24, P34, P44, P54. In some embodiments, the lines R3, R4 are in a X direction or Y direction, and the X direction is perpendicular to the Y direction as shown in FIG. 1.

In one embodiment, the processor 120 accesses and executes the at least one computer readable instruction to reduce the grayscale data of the pixels when the comparison result indicates that the length E of the seam 200 is lower than the predetermined value. With respect to step 230, when the length E of the seam 200 is lower than the predetermined length value, it represents that the LED panels 300, 400 are too close to each other such that the spacing L is smaller than the pixel spacing in the LED panel 300 or 400 (such as the spacing S1 or S2 shown in FIG. 1). In this situation, there will be a bright line which occurs in the target region 250. Therefore, the processor 120 reduces the grayscale data of the pixel so as to eliminate the bright line which occurs in the target region 250.

In another embodiment, the processor 120 accesses and executes the at least one computer readable instruction to enlarge the grayscale data of the pixels when the comparison result indicates that the length E of the seam 200 is higher than the predetermined value. With respect to step 230, when the length E of the seam 200 is higher than the predetermined length value, it represents that the LED panels 300, 400 are too far from each other such that the spacing L is larger than the pixel spacing in the LED panel 300 or 400. In this situation, there will be a dark line which occurs in the target region 250. Therefore, the processor 120 enlarges the grayscale data of the pixel so as to eliminate the dark line which occurs in the target region 250.

In some embodiment, the processor 120 accesses and executes the at least one computer readable instruction to reduce the grayscale data of the pixels when the comparison result indicates that a luminance average of image around the seam 200 is higher than the predetermined value. With respect to step 230, when the luminance average of image around the seam 200 is higher than the predetermined luminance average value, there will be a bright line which occurs in the target region 250. Therefore, the processor 120 reduces the grayscale data of the pixel so as to eliminate the bright line which occurs in the target region 250.

In one embodiment, the processor 120 accesses and executes the at least one computer readable instruction to enlarge the grayscale data of the pixels when the comparison result indicates that a luminance average of image around the seam 200 is lower than the predetermined value. With respect to step 230, when the luminance average of image around the seam 200 is lower than the predetermined luminance average value, there will be a dark line which occurs in the target region 250. Therefore, the processor 120 enlarges the grayscale data of the pixel so as to eliminate the dark line which occurs in the target region 250.

A luminance-chromaticity calibration matrix is used for an ordinary luminance-chromaticity calibration performed on grayscale data (also called pixel data) of each pixel. But in this disclosure, a modified luminance-chromaticity calibration matrix generated by considering a gain value is used for an improved luminance-chromaticity calibration performed on grayscale data, such that resultant calibrated grayscale data (named modified calibrated grayscale data hereinafter) of a pixel, especially the pixel located in the boundary area of the LED panel, may help eliminate the nonuniform luminance phenomenon appearing around the seam between two adjacent LED panels in a large LED display device.

Figure 3:
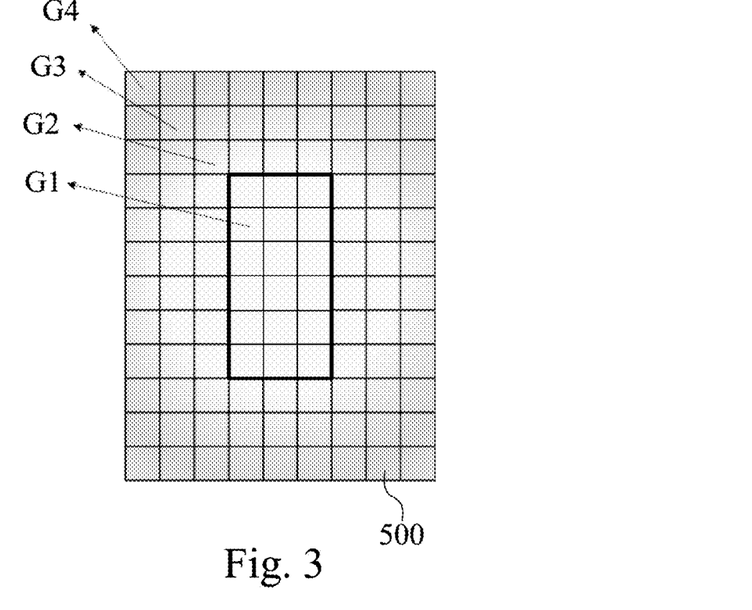
FIG. 3 depicts a schematic diagram of a pixel array of a LED panel with a gain matrix according to one embodiment of the present disclosure.
Figure 4:
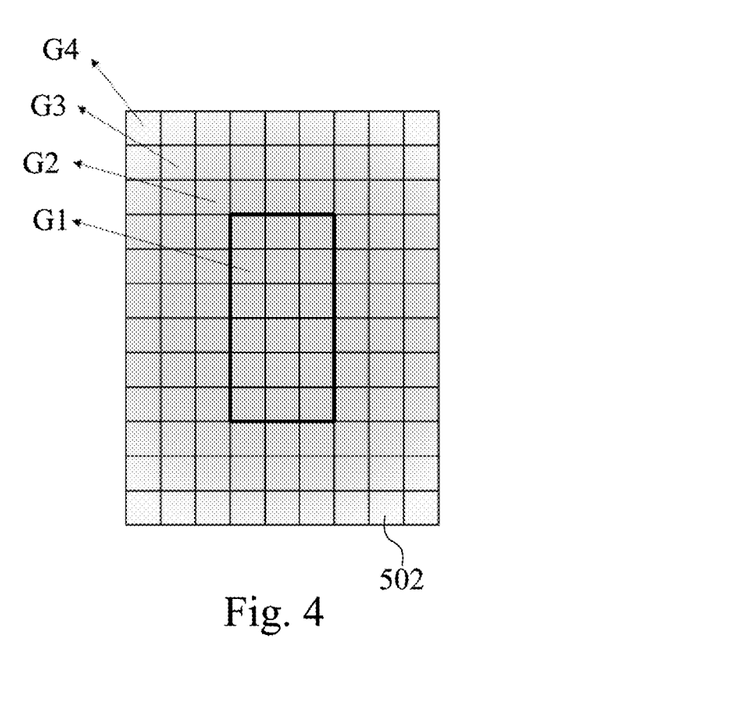
FIG. 4 depicts a schematic diagram of a pixel array of a LED panel with a gain matrix according to one embodiment of the present disclosure.

FIG. 3 depicts a schematic diagram of a pixel array of a LED panel with a gain matrix according to one embodiment of the present disclosure. FIG. 4 depicts a schematic diagram of a pixel array of a LED panel with a gain matrix according to one embodiment of the present disclosure. Each grid in FIG. 3 or FIG. 4 represents a pixel and different grayscale color drawn in each grid depicts a tendency that a gain value is applied to calibrate the luminance of the pixel to become brighter, darker, or the same. By setting elements (gain values) of the gain matrix corresponding to the pixel array of each LED panel, the nonuniform luminance phenomenon appearing around the seam between two adjacent LED panels or even appearing in anywhere of the LED panel may be significantly eliminated. As can be seen in FIG. 3 and FIG. 4, the gain matrices 500 and 502 are provided. Each of the gain matrices 500 and 502 in FIG. 3 and FIG. 4 includes a plurality of gain values respectively being corresponding to the pixels of the LED panel, which means that each gain value is used to multiply all coefficients of a luminance-chromaticity calibration matrix of a corresponding pixel. As an example, FIG. 3 and FIG. 4 illustrate four gain values G1~G4 among the gain matrices 500 and 502, wherein the gain value G1 is applied to a luminance-chromaticity calibration matrix of a pixel in the center area of the LED panel, the gain values G2 and G3 are applied to luminance-chromaticity calibration matrices of pixels in the surrounding area (surrounding the center area) of the LED panel, and the gain value G4 is applied to a luminance-chromaticity calibration matrix of a pixel in the boundary area of the LED panel. In one embodiment, the gain value G1 with respect to the pixel in the center area of the LED panel is set to 1, and other gain value is set to be larger or smaller than 1. The luminance-chromaticity calibration matrix after being multiplied by the corresponding gain value is regarded as the modified luminance-chromaticity calibration matrix. Reference is made to FIG. 1 to FIG. 4. In one embodiments, the processor 120 accesses and executes the at least one computer readable instruction to multiply a plurality of luminance-chromaticity calibration matrices corresponding to one of the two LED panels 300, 400 by the gain matrix 500 in FIG. 3, wherein each of the luminance-chromaticity calibration matrices corresponding to each of the pixels arranged in one line of the one of the two LED panels 300, 400 being adjacent to the seam 200 is multiplied by the corresponding gain value; and next, the processor 120 accesses and executes another computer readable instruction to multiply the grayscale data of each pixel of the pixels by a corresponding one of the luminance-chromaticity calibration matrices multiplied by the corresponding gain value, and in other words, to multiply the grayscale data of each pixel of the pixels by the modified luminance-chromaticity calibration matrix.

With respect to step 230, the processor 120 multiplies the luminance-chromaticity calibration matrices corresponding to one (e.g., the LED panel 300) of the two LED panels 300, 400 by the gain matrix 500 corresponding to the one (e.g., the LED panel 300) of the two LED panels 300, 400. The gain matrix 500 includes a plurality of gain values, and each of the luminance-chromaticity calibration matrices corresponding to each pixel of the pixels arranged in one line (e.g., line R3) of the one (e.g., the LED panel 300) of the two LED panels 300, 400 is multiplied by a corresponding one gain value of the plurality of gain values. Substantially, the processor 120 multiplies the grayscale data of each pixel of the pixels by a corresponding one of the luminance-chromaticity calibration matrices multiplied by a gain value (corresponding to the pixel) of the gain matrix 500. The gain matrix 502 in FIG. 4 may be used in a similar manner.

Regardless of the gain matrix, the ordinary luminance-chromaticity calibration performed on a target pixel of LED panel can be presented as a transformation formula as formula 1 shown below:

$$\begin{bmatrix} R_o \\ G_o \\ B_o \end{bmatrix} = \begin{bmatrix} c_{11} & c_{12} & c_{13} \\ c_{21} & c_{22} & c_{23} \\ c_{31} & c_{32} & c_{33} \end{bmatrix} \times \begin{bmatrix} R_i \\ G_i \\ B_i \end{bmatrix} \quad \text{formula 1}$$

Formula 1 is given based on a 3×3 luminance-chromaticity calibration matrix as an example. In formula 1, $R_i$, $G_i$, and $B_i$ are the original grayscale data of the target pixel, $R_o$, $G_o$, and $B_o$, are the calibrated grayscale data of the target pixel, and the luminance-chromaticity calibration matrix consists of luminance-chromaticity calibration coefficients $C_{11}$~$C_{33}$.

In this disclosure, the improved luminance-chromaticity calibration performed on a target pixel of LED panel can be presented as a modified transformation formula as formula 2 shown below:

$$\begin{bmatrix} R'_o \\ G'_o \\ B'_o \end{bmatrix} = \left( \begin{bmatrix} c_{11} & c_{12} & c_{13} \\ c_{21} & c_{22} & c_{23} \\ c_{31} & c_{32} & c_{33} \end{bmatrix} \times Gn \right) \times \begin{bmatrix} R_i \\ G_i \\ B_i \end{bmatrix} \quad \text{formula 2}$$

Formula 2 is given based on a 3×3 luminance-chromaticity calibration matrix as an example. In Formula 2, $R_i$, $G_i$, and $B_i$ are the original grayscale data of the target pixel, $R'_o$, $G'_o$, and $B'_o$ are the modified calibrated grayscale data of the target pixel, the luminance-chromaticity calibration matrix consists of luminance-chromaticity calibration coefficients $C_{11}$~$C_{33}$, and Gn is the gain value given to the luminance-chromaticity calibration matrix of the target pixel. Any one of the gain values G1~G4 in FIG. 3 or FIG. 4 may be used as Gn, to obtain the modified calibrated grayscale data ($R'_o$, $G'_o$, $B'_o$). In this embodiment, original grayscale data of each pixel in the boundary line R3 of the LED panel 300 and original grayscale data of each pixel in the boundary line R4 of the LED panel 400 can be calibrated by using respective modified luminance-chromaticity calibration matrices, which may be the same modified luminance-chromaticity calibration matrix for the two LED panels or different modified luminance-chromaticity calibration matrices for the two LED panels, not limited in embodiments of this disclosure. As a result, the nonuniform luminance phenomenon appearing around the seam between the LED panels 300 and 400 may be eliminated.

In this embodiment, each gain value of the gain matrix is applied to multiply all coefficients associated with all sub-pixel colors of one pixel of a luminance-chromaticity calibration matrix. For example, luminance-chromaticity calibration coefficients corresponding to a green sub-pixel, a blue sub-pixel and a red sub-pixel of a full-color pixel are multiplied by the same gain value. In another example, luminance-chromaticity calibration coefficients corresponding to a green sub-pixel and a red sub-pixel of a sub-pixel rending (SPR) pixel which includes only two sub-pixels are multiplied by the same gain value.

In another embodiment, an improved luminance-chromaticity calibration performed on a target pixel of LED panel (no matter where the target pixel is located) can be presented as another modified transformation formula as formula 3 shown below:

$$\begin{bmatrix} R'_o \\ G'_o \\ B'_o \end{bmatrix} = \left( \begin{bmatrix} c_{11} & c_{12} & c_{13} \\ c_{21} & c_{22} & c_{23} \\ c_{31} & c_{32} & c_{33} \end{bmatrix} \times \begin{bmatrix} G_R \\ G_G \\ G_B \end{bmatrix} \right) \times \begin{bmatrix} R_i \\ G_i \\ B_i \end{bmatrix} \quad \text{formula 3}$$

In this embodiment, each element of a gain matrix is a gain set including at least two gain values respectively assigned to at least two sub-pixels of the corresponding pixel. For LED panel of full-color pixels, each gain set includes three gain values $G_R$, $G_G$, $G_B$ respectively assigned to red, green and blue sub-pixels. For the LED panel where each SPR pixel consists of only two sub-pixels, each gain set include two gain values respectively assigned to the two sub-pixels of the corresponding pixel. The improved luminance-chromaticity calibration by performing Formula 3 may also be used in step 230 of the method 20 of FIG. 2 for adjusting luminance-chromaticity of the pixels of the LED panel.

Reference is made to FIG. 1, FIG. 3, and FIG. 4. In some embodiment, gain values vary up and down between a gain value corresponding to the pixel in the center area of the LED panel 300 such as 1 and another gain value corresponding to the pixel in the boundary area of the LED panel 300, such as 0.5. For example, the gain values G1 to G4 shown in FIG. 3 may be 1, 0.7, 0.9, and 0.5. However, the values of the gain G1 to the gain G4 are not limited in this embodiment. Other suitable values can be adopted according to actual requirements.

Reference is made to FIG. 1, FIG. 3, and FIG. 4. In one embodiment, the gain values reduce or rise from a gain value corresponding to the pixel in the center area of the LED panel 300 to another gain value corresponding to the pixel in the boundary area of the LED panel 30 along a horizontal axis. For example, the gain values G1 to G4 shown in FIG. 3 may be 1, 0.9, 0.7, and 0.5. For example, the gain values G1 to G4 shown in FIG. 4 may be 1, 1.1, 1.3, and 1.5. Other suitable values can be adopted according to actual requirements.

Reference is made to FIG. 1, FIG. 3, and FIG. 4. In some embodiment, the processor 120 accesses and executes the at least one computer readable instruction to multiply a plurality of luminance-chromaticity calibration matrices corresponding to pixels in a plurality of boundary regions of the LED panel 300 of the two LED panels 300, 400 by a plurality of gain matrices corresponding to the boundary regions (e.g., upper, lower, left, and right sides) of the LED panel 300 of the two LED panels 300, 400.

FIG. 5A to FIG. 5D depict schematic diagrams of active matrices according to embodiments of the present disclosure. The active matrices in FIG. 5A to FIG. 5D are the active matrix 510, the active matrix 520, the active matrix 530, and the active matrix 540, which are applied to the same LED panel such as LED panel 300. Reference is made to FIG. 1 and FIG. 5A to FIG. 5D. In one embodiment, the processor 120 accesses and executes the at least one computer readable instruction to multiply the plurality of luminance-chromaticity calibration matrices corresponding to the pixels of the LED panel 300 by a plurality of active matrices 510~540 corresponding to a plurality of boundary regions E1~E4 of the LED panel 300. By using the active matrices, luminance-chromaticity calibration matrices are not repeatedly used for calibrating the grayscale data of the same pixel in the corner regions.

Figure 5A:
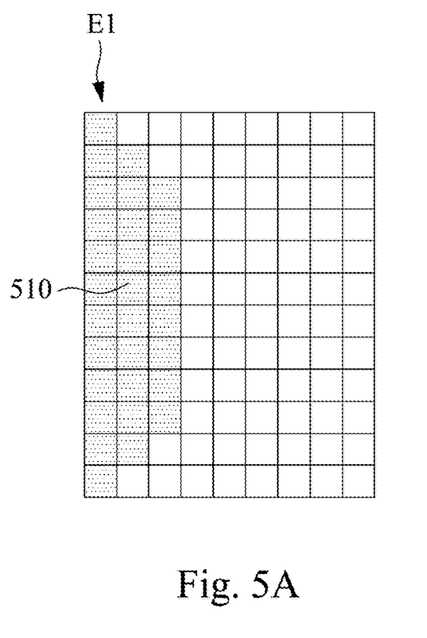
FIG. 5A to FIG. 5D depict schematic diagrams of active matrices according to embodiments of the present disclosure.
Figure 5B:
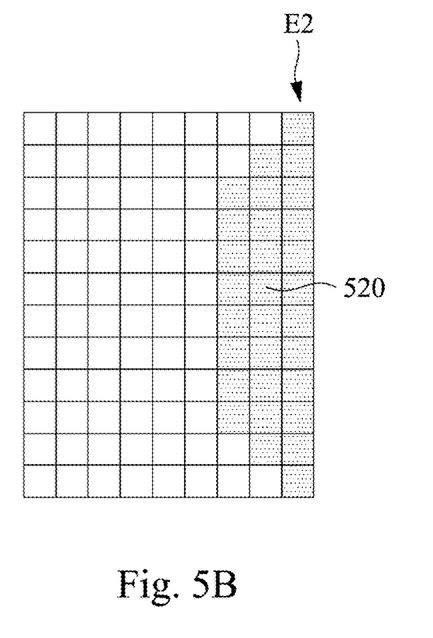
Figure 5C:
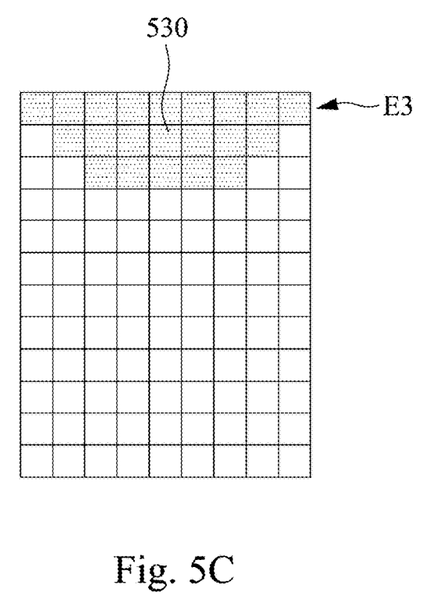
Figure 5D:
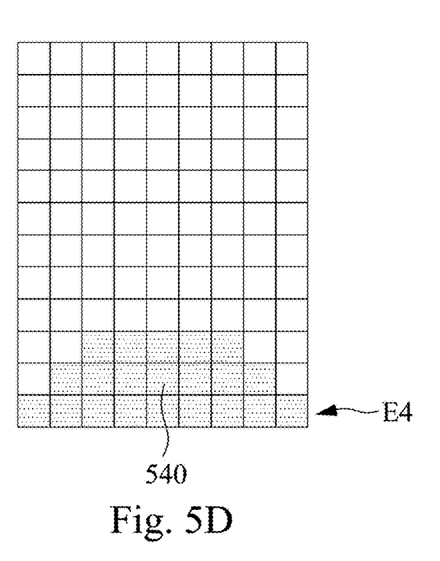

For example, as shown in FIG. 1 and FIG. 5A, the processor 120 multiplies the plurality of luminance-chromaticity calibration matrices corresponding to the LED panel 300 by an active matrix 510 corresponding to a boundary region E1 of the LED panel 300. As shown in FIG. 1 and FIG. 5B, the processor 120 multiplies the plurality of luminance-chromaticity calibration matrices corresponding to the LED panel 300 by an active matrix 520 corresponding to a boundary region E2 of the LED panel 300. Similarly, as shown in FIG. 1, FIG. 5C, and FIG. 5D, the processor 120 multiplies the plurality of luminance-chromaticity calibration matrices corresponding to the LED panel 300 by the plurality of active matrices 530, 540 corresponding to boundary regions E3, E4 of the LED panel 300.

Reference is made to FIG. 1, FIG. 3, FIG. 4, and FIG. 5A to FIG. 5D. In one embodiment, the processor 120 accesses and executes the at least one computer readable instruction to multiply the gain matrix 500 corresponding to the one of the two LED panels 300, 400 by a plurality of active matrices 510~540 corresponding to a plurality of boundary regions E1~E4 of the one of the two LED panels 300, 400 to generate a multiplied result; multiply a plurality of luminance-chromaticity calibration matrices corresponding to the one of the two LED panels 300, 400 by the multiplied result; and multiply the grayscale data of each pixel of the pixels by a corresponding one of the luminance-chromaticity calibration matrices multiplied by the gain matrix 500. In a condition that the nonuniform luminance phenomenon appears around not only the seam between two horizontally-adjacent LED panels (shown in FIG. 1) but also the seam between two vertically-adjacent LED panels, active matrices can be used for avoiding repeatedly modifying the luminance-chromaticity calibration matrices of the same pixel in the corner region of the LED panel.

Reference is made to FIG. 1, FIG. 3, FIG. 4, and FIG. 5A to FIG. 5D. In one another embodiment, the processor 120 accesses and executes the at least one computer readable instruction to multiply a plurality of luminance-chromaticity calibration matrices corresponding to a plurality of boundary regions of the LED panel of the two LED panels by a plurality of regional gain matrices corresponding to the boundary regions of the first LED panel. Different from the single gain matrix corresponding to the pixels of the entire display area of the LED panel, the regional gain matrices are generally corresponding to the upper, lower, left, and right boundary regions of the LED panel, without regarding to other region such as the center area of the LED display panel.

Figure 6:
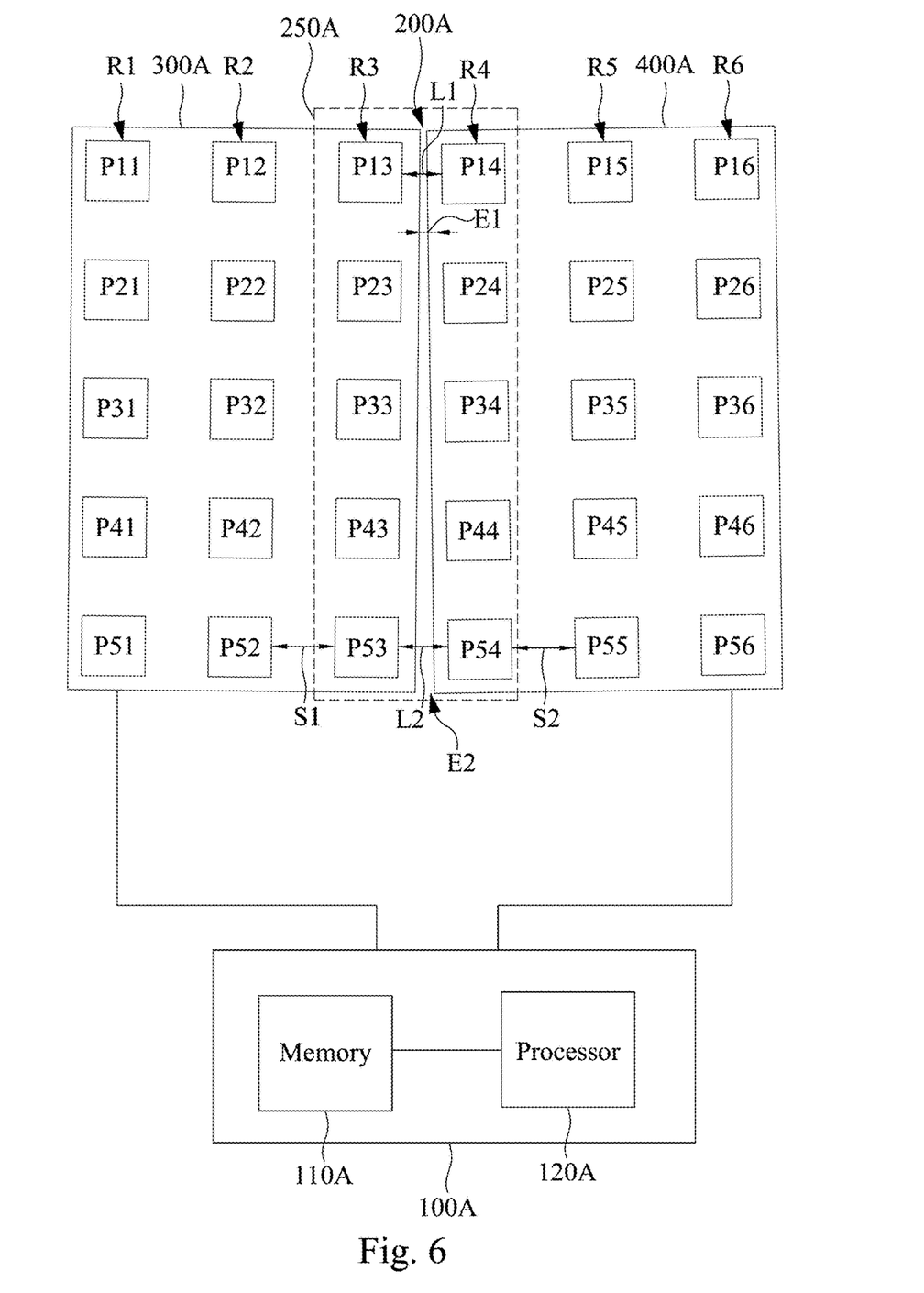
FIG. 6 depicts a schematic diagram of LED panels and a calibrating device according to one embodiment of the present disclosure.

FIG. 6 depicts a schematic diagram of LED panels and a calibrating device according to one embodiment of the present disclosure. Compared with the LED panels 300, 400 in FIG. 1 of the present disclosure, the width of the seam 200A between the LED panels 300A and 400A is not uniform along the vertical direction, i.e., the width E1 and the width E2 of the seam 200A are different. Hence, the pixel P13 in the LED panel 300A and the pixel P14 in the LED panel 400A are too close to each other, which means the spacing L1 is smaller than the pixel spacing of the LED panel 300A or 400A, and a bright line is therefore formed. In addition, the pixel P53 in the LED panel 300A and the pixel P54 in the LED panel 400A are too far from each other, which means the spacing L2 is larger than the pixel spacing of the LED panel 300A or 400A, and a dark line is therefore formed.

Since the processor 120A can access and execute the at least one computer readable instruction to perform the method in FIG. 2, the bright line and the dark line occur in the target region 250A which the seam 200A is in can be eliminated.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for adjust luminance-chrominance of pixels of two LED panels, the method being utilized in a calibrating device, and the method comprising:
   analyzing an image of a target region which a seam between the two LED panels disposed side by side is in, to obtain characteristic data associated with the seam;
   comparing the characteristic data associated with the seam with a predetermined value to generate a comparison result; and
   adjusting grayscale data of pixels of a first LED panel of the two LED panels based on the comparison result, for adjusting luminance-chromaticity of the pixels, wherein the pixels which grayscale data are adjusted comprises at least one pixel line of the first LED panel adjacent to the seam, wherein the at least one pixel line is in a first direction or a second direction, and the first direction is perpendicular to the second direction.

2. The method of claim 1, wherein adjusting grayscale data of the pixels of the first LED panel of the two LED panels comprises:
   reducing grayscale data of at least a part of the pixels when the comparison result indicates that a length of the seam is lower than the predetermined value.

3. The method of claim 1, wherein adjusting grayscale data of the pixels of the first LED panel of the two LED panels comprises:
   enlarging grayscale data of at least a part of the pixels when the comparison result indicates that a length of the seam is higher than the predetermined value.

4. The method of claim 1, wherein adjusting grayscale data of the pixels of the first LED panel of the two LED panels comprises:
   reducing grayscale data of at least a part of the pixels when the comparison result indicates that a luminance average of image around the seam is higher than the predetermined value.

5. The method of claim 1, wherein adjusting grayscale data of the pixels of the first LED panel of the two LED panels comprises:
   enlarging grayscale data of at least a part of the pixels when the comparison result indicates that a luminance average of image around the seam is lower than the predetermined value.

6. The method of claim 1, wherein adjusting grayscale data of the pixels of the first LED panel of the two LED panels comprises:
   multiplying a plurality of luminance-chromaticity calibration matrices corresponding to the first LED panel by a gain matrix corresponding to the first LED panel, wherein the gain matrix comprises a plurality of gain values each of the luminance-chromaticity calibration matrices is multiplied by a corresponding gain vale of the plurality of gain values of the gain matrix, and each of the luminance-chromaticity calibration matrices is corresponding to each of the at least one pixel line of the first LED panel adjacent to the seam; and
   multiplying the grayscale data of each pixel of the at least one pixel line by a corresponding one of the luminance-chromaticity calibration matrices multiplied by the gain matrix.

7. The method of claim 6, wherein the plurality of gain values of the gain matrix are corresponding to pixels of the first LED panel, wherein the gain values vary up and down between a center of the gain matrix corresponding to a center pixel of the first LED panel and a boundary of the gain matrix corresponding to a boundary pixel of the first LED panel.

8. The method of claim 6, wherein the plurality of gain values of the gain matrix are corresponding to pixels of the first LED panel, wherein the gain values reduce or rise from a center of the gain matrix corresponding to a center pixel of the first LED panel to a boundary of the gain matrix corresponding to a boundary pixel of the first LED panel.

9. The method of claim 6, wherein adjusting grayscale data of the pixels of the first LED panel of the two LED panels comprises:
   multiplying the plurality of luminance-chromaticity calibration matrices corresponding to the first LED panel by a plurality of active matrices corresponding to a plurality of boundary regions of the first LED panel.

10. The method of claim 1, wherein adjusting grayscale data of the pixels of the first LED panel of the two LED panels comprises:
    multiplying a plurality of luminance-chromaticity calibration matrices corresponding to the first LED panel by a gain matrix corresponding to the first LED panel, wherein the gain matrix comprises a plurality of gain sets, each of the luminance-chromaticity calibration matrices is multiplied by a corresponding gain set of the plurality of gain sets of the gain matrix and each of the luminance-chromaticity calibration matrices is corresponding to each pixel of the at least one pixel line of the first LED panel adjacent to the seam; and
    multiplying the grayscale data of each pixel of the at least one pixel line by a corresponding one of the luminance-chromaticity calibration matrices multiplied by the gain matrix;
    wherein each of the plurality of gain sets is corresponding to a corresponding pixel and comprises at least two gain values respectively assigned to at least two sub-pixels of the corresponding pixel.

11. The method of claim 1, wherein adjusting grayscale data of the pixels of the first LED panel of the two LED panels comprises:
    multiplying a gain matrix corresponding to the first LED panel by a plurality of active matrices corresponding to a plurality of boundary regions of the one of the two LED panels to generate a multiplied result;
    multiplying a plurality of luminance-chromaticity calibration matrices corresponding to the first LED panel by the multiplied result; and
    multiplying the grayscale data of each pixel of the pixels by a corresponding one of the luminance-chromaticity calibration matrices multiplied by the gain matrix.

12. The method of claim 1, wherein adjusting grayscale data of the pixels of the first LED panel of the two LED panels comprises:
    multiplying a plurality of luminance-chromaticity calibration matrices corresponding to a plurality of boundary regions of the first LED panel by a plurality of gain matrices corresponding to the boundary regions of the first LED panel.

13. A calibrating device, comprising:
a memory configured to store at least one computer readable instruction; and
a processor electrically coupled to the memory, and configured to access and execute the at least one computer readable instruction to:
analyze an image of a target region which a seam between two LED panels disposed side by side is in, to obtain characteristic data associated with the seam;
compare the characteristic data associated with the seam with a predetermined value to generate a comparison result; and
adjust grayscale data of pixels of a first LED panel of the two LED panels based on the comparison result, for adjusting luminance-chromaticity of the pixels, wherein the pixels which grayscale data are adjusted comprises at least one pixel line of the first LED panel adjacent to the seam, wherein the at least one pixel line is in a first direction or a second direction, and the first direction is perpendicular to the second direction.

14. The calibrating device of claim 13, wherein adjusting the grayscale data of the pixels, to which the processor accesses and executes the at least one computer readable instruction, comprises:
reducing grayscale data of at least a part of the pixels when the comparison result indicates that a length of the seam is lower than the predetermined value.

15. The calibrating device of claim 13, wherein adjusting the grayscale data of the pixels, to which the processor accesses and executes the at least one computer readable instruction, comprises:
enlarging grayscale data of at least a part of the pixels when the comparison result indicates that a length of the seam is higher than the predetermined value.

16. The calibrating device of claim 13, wherein adjusting the grayscale data of the pixels, to which the processor accesses and executes the at least one computer readable instruction, comprises:
reducing grayscale data of at least a part of the pixels when the comparison result indicates that a luminance average of image around the seam is higher than the predetermined value.

17. The calibrating device of claim 13, wherein adjusting the grayscale data of the pixels, to which the processor accesses and executes the at least one computer readable instruction, comprises:
enlarging grayscale data of at least a part of the pixels when the comparison result indicates that a luminance average of image around the seam is lower than the predetermined value.

18. The calibrating device of claim 13, wherein adjust the grayscale data of the pixels, to which the processor accesses and executes the at least one computer readable instruction, comprises:
multiplying a plurality of luminance-chromaticity calibration matrices corresponding to the first LED panel by a gain matrix corresponding to the first LED panel, wherein the gain matrix comprises a plurality of gain values, each of the luminance-chromaticity calibration matrices is multiplied by a corresponding gain vale of the plurality of gain values of the gain matrix and each of the luminance-chromaticity calibration matrices is corresponding to each pixel of the at least one pixel line of the first LED panel adjacent to the seam; and
multiplying the grayscale data of each pixel of the at least one pixel line by a corresponding one of the luminance-chromaticity calibration matrices multiplied by the gain matrix.

19. The calibrating device of claim 18, wherein the plurality of gain values of the gain matrix are corresponding to pixels of the first LED panel, wherein the gain values vary up and down between a center of the gain matrix corresponding to a center pixel of the first LED panel and a boundary of the gain matrix corresponding to a boundary pixel of the first LED panel.

20. The calibrating device of claim 18, wherein the plurality of gain values of the gain matrix are corresponding to pixels of the first LED panel, wherein the gain values reduce or rise from a center of the gain matrix corresponding to a center pixel of the first LED panel to a boundary of the gain matrix corresponding to a boundary pixel of the first LED panel.

21. The calibrating device of claim 18, wherein adjusting the grayscale data of the pixels, to which the processor accesses and executes the at least one computer readable instruction, comprises:
multiplying the plurality of luminance-chromaticity calibration matrices corresponding to the first LED panel by a plurality of active matrixes corresponding to a plurality of boundary regions of the first LED panel.

22. The calibrating device of claim 13, wherein adjust the grayscale data of the pixels, to which the processor accesses and executes the at least one computer readable instruction, comprises:
multiplying a plurality of luminance-chromaticity calibration matrices corresponding to the first LED panel by a gain matrix corresponding to the first LED panel, wherein the gain matrix comprises a plurality of gain sets, each of the luminance-chromaticity calibration matrices is multiplied by a corresponding gain set of the plurality of gain sets of the gain matrix and each of the luminance-chromaticity calibration matrices is corresponding to each pixel of the at least one pixel line of the first LED panel adjacent to the seam; and
multiplying the grayscale data of each pixel of the at least one pixel line by a corresponding one of the luminance-chromaticity calibration matrices multiplied by the gain matrix;
wherein each of the plurality of gain sets is corresponding to a corresponding pixel and comprises at least two gain values respectively assigned to at least two sub-pixels of the corresponding pixel.

23. The calibrating device of claim 13, wherein adjust the grayscale data of the pixels, to which the processor accesses and executes the at least one computer readable instruction, comprises:
multiplying a gain matrix corresponding to the first LED panel by a plurality of active matrices corresponding to a plurality of boundary regions of the one of the two LED panels to generate a multiplied result;
multiplying a plurality of luminance-chromaticity calibration matrices corresponding to the first LED panel by the multiplied result; and
multiplying the grayscale data of each pixel of the pixels by a corresponding one of the luminance-chromaticity calibration matrices multiplied by the gain matrix.

24. The calibrating device of claim 13, wherein adjusting the grayscale data of the pixels, to which the processor accesses and executes the at least one computer readable instruction, comprises:

multiplying a plurality of luminance-chromaticity calibration matrices corresponding to a plurality of boundary regions of the first LED panel by a plurality of gain matrices corresponding to the boundary regions of the first LED panel.

25. The calibrating device of claim 1, wherein the pixels which grayscale data are adjusted comprises a plurality of pixel lines of the first LED panel adjacent to the seam.

* * * * *